United States Patent [19]

Laroche et al.

[11] Patent Number: 5,373,322
[45] Date of Patent: Dec. 13, 1994

[54] APPARATUS AND METHOD FOR ADAPTIVELY INTERPOLATING A FULL COLOR IMAGE UTILIZING CHROMINANCE GRADIENTS

[75] Inventors: Claude A. Laroche, Hilton; Mark A. Prescott, Rochester, both of N.Y.

[73] Assignee: Eastman Kodak Company, Rochester, N.Y.

[21] Appl. No.: 85,519

[22] Filed: Jun. 30, 1993

[51] Int. Cl.$^5$ .............................................. H04N 9/07
[52] U.S. Cl. ...................................... 348/273; 348/272
[58] Field of Search ................. 358/41, 42, 43, 44, 358/163, 213.15, 213.17; 348/266, 272, 273; H04N 9/07

[56] References Cited

PUBLICATIONS

Kodak Professional DCS 200 Digital Camera System, Programmer's Reference Manual, Dec. 1992.

*Primary Examiner*—Mark R. Powell
*Assistant Examiner*—Cheryl Cohen
*Attorney, Agent, or Firm*—David M. Woods

[57] ABSTRACT

Adaptive interpolation is performed by apparatus operating upon a digitized image signal obtained from an image sensor having color photosites that generate a plurality of color values, but only one color per photosite. A digital processor obtains gradient values from the differences between chrominance values in vertical and horizontal image directions. The gradient values are compared with each other in order to select one of the directions as the preferred orientation for the interpolation of additional luminance values. The interpolation is then performed upon values selected to agree with the preferred orientation.

19 Claims, 2 Drawing Sheets

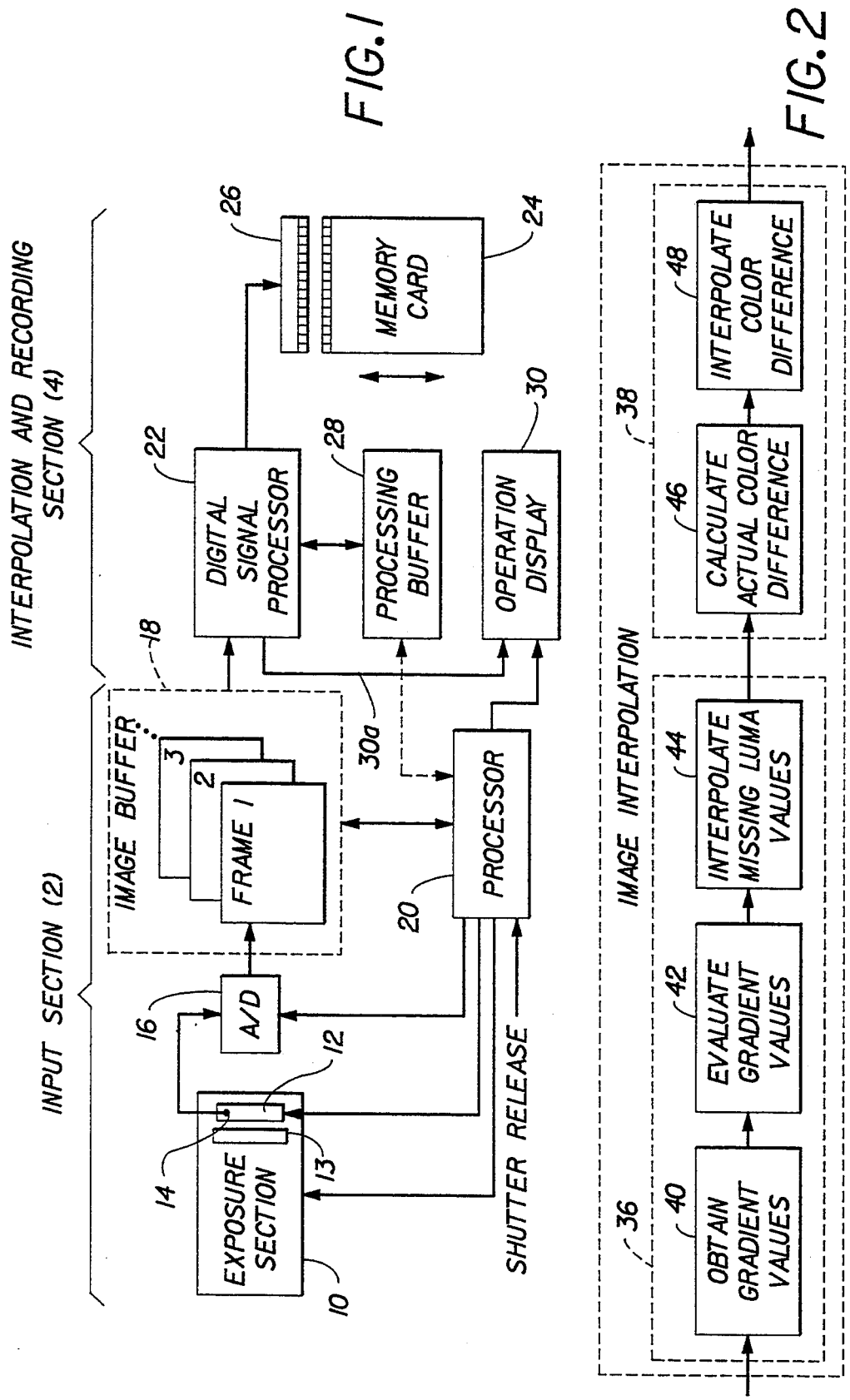

|   |   |   |   |   |   |   |
|---|---|---|---|---|---|---|
| G | R | G | R | G | R | G |
| B | G | B | G | B | G | B |
| G | R | G | R | G | R | G |
| B | G | B | G | B | G | B |

FIG.3

| G11 | R12 | G13 | R14 | G15 | R16 | G17 | ... |
|-----|-----|-----|-----|-----|-----|-----|-----|
| B21 | G22 | B23 | G24 | B25 | G26 | B27 | ... |
| G31 | R32 | G33 | R34 | G35 | R36 | G37 | ... |
| B41 | G42 | B43 | G44 | B45 | G46 | B47 | ... |
| G51 | R52 | G53 | R54 | G55 | R56 | G57 | ... |
| B61 | G62 | B63 | G64 | B65 | G66 | B67 | ... |

FIG.4

APPARATUS AND METHOD FOR ADAPTIVELY INTERPOLATING A FULL COLOR IMAGE UTILIZING CHROMINANCE GRADIENTS

FIELD OF INVENTION

This invention pertains to the field of electronic imaging, in particular to the generation of color images.

BACKGROUND OF THE INVENTION

A single-sensor camera detects the spatially varying intensity of light at image locations corresponding to a regular pattern of pixel locations on the sensor. In a color single-sensor camera, a color filter array overlies the sensor such that the sensor detects the intensity of colors at varying pixel locations according to a regular color filter array (CFA) pattern of, generally, three colors. Ordinarily, the CFA is a regular pattern of color filters for detecting only one color at each pixel location. Consequently, a single sensor color camera does not capture original data corresponding to all three colors for each pixel. Instead, it captures one color for each pixel, so that interpolation is required to construct three full color image planes for each image.

A typical camera system generates red, green, and blue colors. A color filter array interpolation algorithm is used to convert the image from a sparsely sampled color image (one color per pixel) to a full red, green, blue (RGB) image (i.e., RGB for each pixel). Most color filter array patterns have a high-frequency signal that is sampled more regularly, and more frequently, in the pattern than the other colors. In an RGB image, this high frequency signal is green; it is also referred to as the luminance signal, which represents the higher frequency detail and the maximum sensitivity of the human eye. Ordinarily, traditional bilinear interpolation is used to generate a full green image plane. For instance, the green data from green pixels on either side of a red or blue pixel (i.e., a "missing green" pixel) are used to interpolate the "missing green" value for the red or blue location. Then, traditional bilinear interpolation of color difference signals, also called chrominance signals, is utilized to interpolate the other colors of the CFA pattern for each pixel. A traditional method of this type is disclosed in U.S. Pat. No. 4,642,678.

A problem with such traditional methods is that they are prone to colored edge artifacts in the image. This problem can be treated through use of more sophisticated interpolation techniques, such as described in U.S. Pat. No. 4,630,307, which uses prior knowledge about features existing in the neighborhood. The image data is utilized to determine the appropriate algorithm, and the missing data is reconstructed using the selected algorithm. For example, in the '307 patent, different interpolation routines are used for edges, stripes, and corners. The particular feature is determined by comparing the pixel data with templates stored in a computer.

As pointed out before, the major shortcoming of the traditional procedures concerns the generation of artifacts at color edges. The sophisticated procedure, exemplified by the '307 patent, can reduce these artifacts, but at considerable cost and complexity in processing capability.

SUMMARY OF THE INVENTION

An object of the present invention is to modify prior, sophisticated algorithms so as to reduce color edge artifacts and to improve image sharpness, without unduly increasing cost and complexity.

A further object of the invention is to perform interpolation in a simplified, adaptive manner in order to reduce color edge artifacts, reduce noise in the image, and to improve image sharpness.

The above-stated objects are realized by apparatus for processing a digitized image signal obtained from an image sensor having color photosites that generate a plurality of color values, but only one color value for each photosite location. Such apparatus includes a) means for storing the digitized image signal; and
b) a processor operative with said storing means for generating a color value missing from a photosite location by the interpolation of an additional color value for such locations from color values at nearby photosite locations. In accordance with the invention the processor includes a) means for obtaining gradient values in at least two image directions;
b) means responsive to the gradient values for selecting a preferred orientation for the interpolation of the additional color values; and
c) means for interpolating the additional color values from color values at nearby locations selected to agree with the preferred orientation.

The principal advantage of the invention is that it can reduce color artifacts without adding undue complexity to the processing.

BRIEF DESCRIPTION OF THE DRAWINGS

The invention will be described in relation to the drawings, wherein:

FIG. 1 is a block diagram of an electronic still camera employing interpolation processing according to the invention;

FIG. 2 is a block diagram of the interpolation processing technique used in connection with the invention;

FIG. 3 is a diagram of the Bayer geometry for a color filter array; and

FIG. 4 shows a portion of the Bayer geometry with each pixel identified as to row and column in order to explain the interpolation technique.

DESCRIPTION OF THE PREFERRED EMBODIMENTS

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The sensor 12, which includes a two-dimensional array of photosites corresponding to picture elements of the image, is a conventional charge-coupled device (CCD) using either well-known interline transfer or frame transfer techniques. The sensor 12 is covered by a color filter array (CFA) 13, known as the Bayer array, which is described in U.S. Pat. No. 3,971,065 and herewith incorporated by reference. The Bayer geometry is shown in FIG. 3, wherein each color covers a photosite, or picture element (pixel), of the sensor. In particular, chrominance colors (red and blue) are interspersed among a checkerboard pattern of luminance colors (green). The sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the sensor 12 to image light for a time period dependent upon exposure requirements, for example, a time period between 1/1000 second and several seconds. The image charge is then swept from the photosites in the sensor 12, converted to a digital format, and written into the image buffer 18. The driving signals provided by the control processor 20 to the sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the memory card 24 would ordinarily include a directory signifying the beginning and ending of each stored image. This would show on the display 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2; that is, first, the high frequency information for the "missing green" pixels (i.e., the red and blue pixel locations) are interpolated to improve the luminance rendition and, secondly, the color difference information is interpolated at the high frequency locations by traditional bilinear methods to generate the other colors of the CFA pattern. In the implementation shown in FIG. 2, an adaptive interpolation technique is used in the luminance section 36 for optimizing the performance of the system for images with horizontal and vertical edges. "Missing green" pixels are adaptively interpolated either horizontally, vertically or two-dimensionally depending upon the gradient established between the chrominance (red and blue) pixel locations in the vertical and horizontal directions around the "missing green" pixel.

The first step is therefore to obtain gradient values, as represented by the block 40, in at least two image directions, for instance, horizontal and vertical directions. In each direction, the gradients comprise differences between chrominance values at spatially-displaced pixel locations. The horizontal and vertical gradients of the chrominance (red or blue) pixels are then evaluated relative to each other in an evaluation block 42, and a preferred orientation for the interpolation of an additional luminance value is selected from the two directions. The luminance values subject to interpolation are then selected to agree with the preferred orientation, and the missing location is then averaged in block 44 from the two luminance(green) locations situated along whichever gradient is selected. (Four pixels are averaged when both gradients are equal.) Then, the color difference is calculated in a chroma section 38 by subtracting the interpolated green value at each chrominance pixel location (block 46) from the actual color pixel for that location. Finally, the color difference data for each luminance pixel location is interpolated using two-dimensional bilinear interpolation in the block 48. The data at this point may be reconstructed into its original components (RGB) or left as color-difference signals for further processing.

In interpolating green data for pixel locations (red and blue) where green data is missing, the image gradients in horizontal and vertical directions are compared with each other, thereby adaptively adjusting the processing to suit the image data.

The three categories of image data determined from these gradient evaluations are:

A. For (Horizontal Gradient=Vertical Gradient), the image areas represent either high or low scene structure. The four pixels are averaged since there is no evident orientation to the scene structure.

B. For (Horizontal Gradient<Vertical Gradient), the image areas represent predominately horizontal scene structure. Interpolation is performed by averaging horizontally to follow the scene contours and to minimize error caused by scene edges. This also maximizes image sharpness since scene contour information is not "averaged out" of the image.

C. For (Horizontal Gradient>Vertical Gradient), the image areas represent predominately vertical scene structure. Interpolation is performed by averaging vertically to follow the scene contours and to minimize error caused by scene edges. This also maximizes image sharpness since scene contour information is not "averaged out" of the image.

Although not limited to any particular CFA pattern, the interpolation technique has been applied to an RGB Bayer color filter array, as shown in FIG. 3. One characteristic of the Bayer array is that it contains a repetition of RGB in a characteristic Bayer block form, as follows

```
G R
B G
``` with two luminances (greens) always on one diagonal, and two chromas (red and blue) on the other diagonal. The object of the interpolation is to obtain all three colors (RGB) for each pixel location.

In FIG. 4, a portion of a Bayer array is repeated, with each pixel identified by its row and column position. The characteristic Bayer block is shown in outline, with respect to four pixels that are to be evaluated. Each pixel represents values measured by the image sensor 12.

For example, G33 and G44 are luminance (green) values actually measured by the sensor 12. Likewise, R34 and B43 are chrominance (red and blue, respectively) values actually measured by the sensor 12. Consequently, it is necessary to adaptively interpolate luminance values for the chrominance values (R34 and B43) lacking luminance data. With all the luminance determined, chrominance (red and blue) is bilinearly interpolated by reference to color differences (R−G, B−G) from locations in the neighborhood of the interpolated luminance pixels. The color differences are then summed with the luminance for the interpolated pixels to obtain red and blue.

As applied to the Bayer block (outlined) of FIG. 4, the processing algorithms for the green data are as follows:

G33=G33
G34, as follows:
  HDiff=abs(((R32+R36)/2)−R34)
  VDiff=abs(((R14+R54)/2)−R34)
  if (HDiff<VDiff)
    G34=(G33+G35)/2
  else if (VDiff<HDiff)
    G34=(G24+G44)/2
  else
    G34=(G24+G44+G33+G35)/4
G43, as follows:
  HDiff=abs(((B41+B45)/2)−B43)
  VDiff=abs(((B23+B63)/2)−B43)
  if (HDiff<VDiff)
    G43=(G42+G44)/2
  else if (VDiff<HDiff)
    G43=(G33+G53)/2
  else
    G43=(G33+G53+G42+G44)/4
G44=G44 where HDiff and VDiff and the horizontal and vertical gradients, respectively. As can be seen, the gradient calculation uses chrominance values (red or blue) situated vertically or horizontally relative to the pixel for which the luminance data is being interpolated. The chrominance used for the gradient calculation is the same (red or blue) as the chrominance (red or blue) of the pixel location being interpolated, and the value of the pixel being interpolated is further used to normalize the two differences. The first two and the last two lines are not used in the final color image. However, the red and blue values in these lines can be used to interpolate on the third and fourth and fourth-to-last lines and third-to-last lines. This process is then repeated for all the Bayer blocks in the image.

Once the luminance values are determined, the chrominance values are interpolated from the red and blue values, or from color differences values, by conventional bilinear interpolation. For example, for red interpolation R33=((R32−G32)+(R34−G34))/2+G33
R34=R34
R43=((R32−G32)+(R34−G34)+(R52−G52)+(R54−G54))/4+G43
R44=((R34−G34)+(R54−G54))/2+G44
and for blue
B33=((B23−G23)+(B43−G43))/2+G33
B34=((B23−G23)+(B25−G25)+(B43−G43)+(B45−G45))/4+G34
B43=B43
B44=((B43−G43)+(B45−G45))/2+G44

This process is then repeated for all the Bayer blocks in the image. At this point, three complete RGB planes are available for the image.

While the interpolation technique of the invention has been described for use in an electronic camera, it may be incorporated as part of other apparatus for processing color data from an image sensor. For instance, the actual data from the image sensor 12 may be downloaded directly to the memory card 24, and the interpolation processing may take place subsequently when the card 24 is inserted into a player apparatus. The interpolation technique shown in FIG. 2 will then take place in the player. Such a "player" may in practice be a desktop computer, and the interpolation technique of FIG. 2 is performed by a program in the computer.

The invention has been described in detail with particular reference to a presently preferred embodiment, but it will be understood that variations and modifications can be effected within the spirit and scope of the invention.

What is claimed is:

1. Apparatus for processing a digitized image signal obtained from an image sensor having color photosites that generate a plurality of color values, but only one color value for each photosite location, said apparatus comprising:

means for storing the digitized image signal;

a processor operative with said storing means for generating a color value missing from a photosite location by the interpolation of an additional color value for such photosite locations from color values at nearby photosite locations, said processor including means for obtaining gradient values in at least two image directions;

means responsive to the gradient values for selecting a preferred orientation for the interpolation of the additional color values; and means for interpolating the additional color values for such photosite location from color values at nearby locations selected to agree with the preferred orientation.

2. Apparatus as claimed in claim 1 wherein said gradient values are obtained for two orthogonal image directions.

3. Apparatus as claimed in claim 2 wherein said orthogonal image directions are associated with horizontal and vertical directions in the image.

4. Apparatus as claimed in claim 1 wherein said preferred orientation for the interpolation of additional color values coincides with one of said at least two image directions.

5. Apparatus as claimed in claim 1 wherein said means for obtaining gradient values generates differences between color values oriented in each image direction.

6. Apparatus as claimed in claim 1 wherein said means for selecting a preferred orientation compares the gradient values with each other.

7. Apparatus as claimed in claim 1 wherein said color values include a pattern of chrominance values interspersed in a checkerboard pattern of luminance values.

8. Apparatus for processing a digitized image signal obtained from an image sensor having color photosites that generate a plurality of color values, but only one color value for each photosite location, said apparatus comprising:

means for storing the digitized image signal as a pattern of luminance and chrominance values, wherein some photosite locations lack luminance values;

a processor operative with said storing means for generating an additional luminance value missing from a photosite location by the interpolation of the additional luminance value for such locations from luminance values at nearby photosite locations, said processor including means for generating gradient values in at least two image directions;

means responsive to the gradient values for selecting a preferred orientation for the interpolation of an additional luminance value; and means for interpolating the additional luminance value from luminance values selected to agree with the preferred orientation.

9. Apparatus as claimed in claim 8 wherein said gradient values are obtained for two orthogonal image directions.

10. Apparatus as claimed in claim 9 wherein said orthogonal image directions are associated with horizontal and vertical directions in the image.

11. Apparatus as claimed in claim 8 wherein said preferred orientation for the interpolation of additional color values coincides with one of said at least two image directions.

12. Apparatus as claimed in claim 8 wherein said means for obtaining gradient values generates differences between chrominance values oriented in each image direction to obtain chrominance gradients in said directions.

13. Apparatus as claimed in claim 12 wherein said means for selecting a preferred orientation compares the chrominance gradients to each other.

14. Apparatus for processing a digitized image signal obtained from a color image sensor having photosites that generate a pattern of chrominance and luminance values, but only one value for each photosite location, said apparatus comprising:

means for storing the digitized image signal as a pattern of luminance and chrominance values, wherein some photosite locations are chrominance locations lacking luminance values;

a processor operative with the pattern of values in said storing means, said processor generating a luminance value missing from a chrominance location by the interpolation of a missing luminance value for such locations from luminance values at nearby luminance locations, said processor comprising:

means for generating chrominance gradient values from the difference between a pair of chrominance values each oriented in at least two image directions:

means for comparing the chrominance gradient values to each other;

means responsive to the outcome of the gradient comparison for selecting a particular image direction as a preferred orientation for the interpolation of a missing luminance value; and means for interpolating the missing luminance value from luminance values selected to agree with the preferred orientation.

15. Apparatus as claimed in claim 14 wherein said pattern of luminance and chrominance comprises chrominance values interspersed in a checkerboard pattern of luminance values.

16. Apparatus as claimed in claim 15 wherein said luminance color is green, and said chrominance colors are red and blue.

17. A method for interpolating missing color values from a digitized image signal obtained from a color image sensor having photosites that generate a pattern of chrominance and luminance color values, one value for each photosite location, said method comprising the steps of:

obtaining gradient values from the differences between color values in at least two image directions;

evaluating the gradient values relative to a predetermined criterion;

selecting, based on the step of evaluating the gradient values, a preferred orientation for the interpolation of the missing color values; and interpolating each missing color value from like color values at nearby locations selected to agree with the preferred orientation.

18. A method as claimed in claim 17 wherein the step of obtaining gradient values obtains said gradient values from the differences between chrominance values in said directions.

19. A method as claimed in claim 17 wherein the missing color values being interpolated are luminance values.

* * * * *